(12) United States Patent
Roberts et al.

(10) Patent No.: US 11,542,685 B2
(45) Date of Patent: Jan. 3, 2023

(54) METHOD AND SYSTEM FOR PROVIDING DISPLAY REDUNDANCY ON A MACHINE

(71) Applicant: Caterpillar Inc., Peoria, IL (US)

(72) Inventors: Samuel Alec Roberts, Lincolnshire (GB); Crepin Mbappe, Cambridgeshire (GB); Rodney Glen Stazicker, Cambridgeshire (GB)

(73) Assignee: Cateprillar Inc., Peoria, IL (US)

( * ) Notice: Subject to any disclaimer, the term of this patent is extended or adjusted under 35 U.S.C. 154(b) by 101 days.

(21) Appl. No.: 17/045,235

(22) PCT Filed: Apr. 8, 2019

(86) PCT No.: PCT/US2019/026259
§ 371 (c)(1),
(2) Date: Oct. 5, 2020

(87) PCT Pub. No.: WO2019/209509
PCT Pub. Date: Oct. 31, 2019

(65) Prior Publication Data
US 2021/0164197 A1  Jun. 3, 2021

(30) Foreign Application Priority Data
Apr. 26, 2018 (GB) .................... 1806857

(51) Int. Cl.
*E02F 9/26* (2006.01)
*B60K 35/00* (2006.01)

(52) U.S. Cl.
CPC .............. *E02F 9/26* (2013.01); *B60K 35/00* (2013.01); *B60K 2370/178* (2019.05);
(Continued)

(58) Field of Classification Search
CPC ........ B60K 2370/178; B60K 2370/182; B60K 2370/186; B60K 2370/195; B60K 35/00; E02F 9/24; E02F 9/26; E02F 9/268
See application file for complete search history.

(56) References Cited

U.S. PATENT DOCUMENTS

| 4,562,433 A | 12/1985 | Biferno |
| 7,999,759 B2 | 8/2011 | Selbrede |

(Continued)

FOREIGN PATENT DOCUMENTS

| CN | 101520670 A | 9/2009 |
| CN | 103886818 A | 6/2014 |

(Continued)

OTHER PUBLICATIONS

International Search Report for related International Application No. PCT/US2019/026259; dated Aug. 9, 2019.
(Continued)

*Primary Examiner* — Peter D Le

(57) ABSTRACT

A method for providing display redundancy on a machine is provided. The machine includes a first display configured to perform a first set of functionalities associated with one or more operations of the machine and a second display configured to perform a second set of functionalities associated with the one or more operations of the machine, the second set of functionalities being different from the first set of functionalities. The method includes detecting, by a controller, failure of the first display. The method further includes executing, by the controller, at least a subset of the first set of functionalities on the second display along with at least a subset of the second set of functionalities, when the failure of the first display is detected.

8 Claims, 6 Drawing Sheets

(52) U.S. Cl.
CPC .. *B60K 2370/182* (2019.05); *B60K 2370/186* (2019.05); *B60K 2370/195* (2019.05)

(56) References Cited

U.S. PATENT DOCUMENTS

| | | | |
|---|---|---|---|
| 8,203,441 | B2 | 6/2012 | Bolduan |
| 9,007,350 | B2 | 4/2015 | Burgin et al. |
| 2006/0025914 | A1 | 2/2006 | Buschmann |
| 2008/0282155 | A1* | 11/2008 | Kempanna ......... G06F 16/9535 715/273 |
| 2016/0162247 | A1 | 6/2016 | Krzysztof et al. |
| 2016/0186413 | A1* | 6/2016 | Tanaka ................. E02F 9/267 701/29.1 |
| 2016/0350049 | A1* | 12/2016 | Barnidge ............... B64D 43/00 |
| 2017/0166129 | A1* | 6/2017 | Kim ...................... G06V 20/56 |
| 2017/0177957 | A1* | 6/2017 | Yokochi .............. G06V 20/582 |
| 2017/0284069 | A1* | 10/2017 | Machida ............... G06V 20/52 |
| 2018/0203226 | A1* | 7/2018 | Tomioka ................ B60K 37/02 |
| 2019/0164461 | A1* | 5/2019 | Tomioka ................ B60K 35/00 |
| 2019/0202355 | A1* | 7/2019 | Tatara ...................... B60R 1/00 |
| 2019/0233002 | A1* | 8/2019 | Maeshima ............... H02P 5/74 |
| 2020/0063397 | A1* | 2/2020 | Hatake .................... B60R 1/00 |
| 2020/0341445 | A1* | 10/2020 | Chen ................. G05B 19/0423 |

FOREIGN PATENT DOCUMENTS

| | | |
|---|---|---|
| DE | 102009032989 A1 | 1/2011 |
| DE | 102012009000 A1 | 11/2013 |
| FR | 3024850 A1 | 2/2016 |
| WO | WO 2005/036343 A2 | 10/2004 |

OTHER PUBLICATIONS

Great Britain Search Report for related Application No. 1806857.7; dated Nov. 6, 2018.

* cited by examiner

FIG. 5

METHOD AND SYSTEM FOR PROVIDING DISPLAY REDUNDANCY ON A MACHINE

CROSS-REFERENCE TO RELATED APPLICATION

This Application is a 35 USC § 371 US National Stage filing of international Application No. PCT/US2019/026259 filed on Apr. 8, 2019 which claims priority under the Paris Convention to Great Britain Patent Application No. 1806857.7 filed on Apr. 26, 2018.

TECHNICAL FIELD

The present disclosure relates generally to displays provided on a machine and more particularly, to a system and method for providing display redundancy on the machine.

BACKGROUND

Large machines, such as articulated trucks, excavators, electric rope shovels, etc., may have multiple sensors or cameras positioned thereon, to sense multiple operation related parameters associated with the machine. For example, there may be safety cameras installed on the exterior of the machine to monitor the surroundings of the machine to facilitate smooth operations of the machine at a worksite. These cameras and sensors may be coupled to one or more output devices positioned inside an operator cabin to generate output for an operator sitting inside the operator cabin. For example, when an object is detected in proximity of the machine, an alert may be provided on the one or more output devices positioned inside the operator cabin to alert the operator. These one or more output devices may include displays, speakers, tactile feedback devices, etc., positioned inside the operator cabin to provide visual, audio and/or tactile output to the operator.

In recent times, more and more machines are implementing displays with embedded alarm systems. However, when the display fails or malfunctions, the alarms would also not be generated to alert the operator. Additionally, the displays may also perform many other functionalities that may be critical for smooth operations of the machine. Therefore, malfunctioning or failure of the displays may affect smooth operations of the machine, which is not desirable.

US Patent Publication No. 2016/0350049 (hereinafter referred to as the '049 publication) relates to redundant display systems and methods for providing display redundancy. The '049 publication further provides that a display system includes a primary display and at least one secondary display. The primary display and the at least one secondary display are stacked in series relative to a line of sight of a user, and the at least one secondary display is configured to serve as a backup to the primary display upon a failure of the primary display.

SUMMARY OF THE INVENTION

In one aspect, a method for providing display redundancy on a machine is provided. The machine includes a first display configured to perform a first set of functionalities associated with one or more operations of the machine and a second display configured to perform a second set of functionalities associated with the one or more operations of the machine, such that the second set of functionalities being different from the first set of functionalities. The method includes detecting, by a controller, failure of the first display. The method further includes executing, by the controller, at least a subset of the first set of functionalities on the second display along with at least a subset of the second set of functionalities, when the failure of the first display is detected.

In another aspect, a system for providing display redundancy on a machine is provided. The system includes a first display configured to perform a first set of functionalities associated with one or more operations of the machine and a second display configured to perform a second set of functionalities associated with the one or more operations of the machine, such that the second set of functionalities being different from the first set of functionalities. The system further includes a controller communicably coupled to the first display and the second display. The controller is configured to detect a failure of the first display and execute at least a subset of the first set of functionalities on the second display along with at least a subset of the second set of functionalities when the failure of the first display is detected.

In a yet another aspect, a machine is provided. The machine includes a frame, an operator cab supported on the frame, and a first and a second display positioned inside the operator cab. The first display is configured to perform a first set of functionalities associated with one or more operations of the machine and the second display is configured to perform a second set of functionalities associated with the one or more operations of the machine, such that the second set of functionalities being different from the first set of functionalities. The machine further includes a controller communicably coupled to the first display and the second display. The controller is configured to receive heart beat signals from each of the first and the second display at regular time intervals. The controller is further configured to detect a failure of the first display when the controller fails to receive the heart beat signal from the first display for a predefined time-period. Furthermore, the controller is configured to execute at least a subset of the first set of functionalities on the second display along with at least a subset of the second set of functionalities when the failure of the first display is detected.

BRIEF DESCRIPTION OF THE DRAWINGS

FIG. 5 illustrates exemplary functionalities performed by the second display when the first display fails, in accordance with the concepts of the present disclosure.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
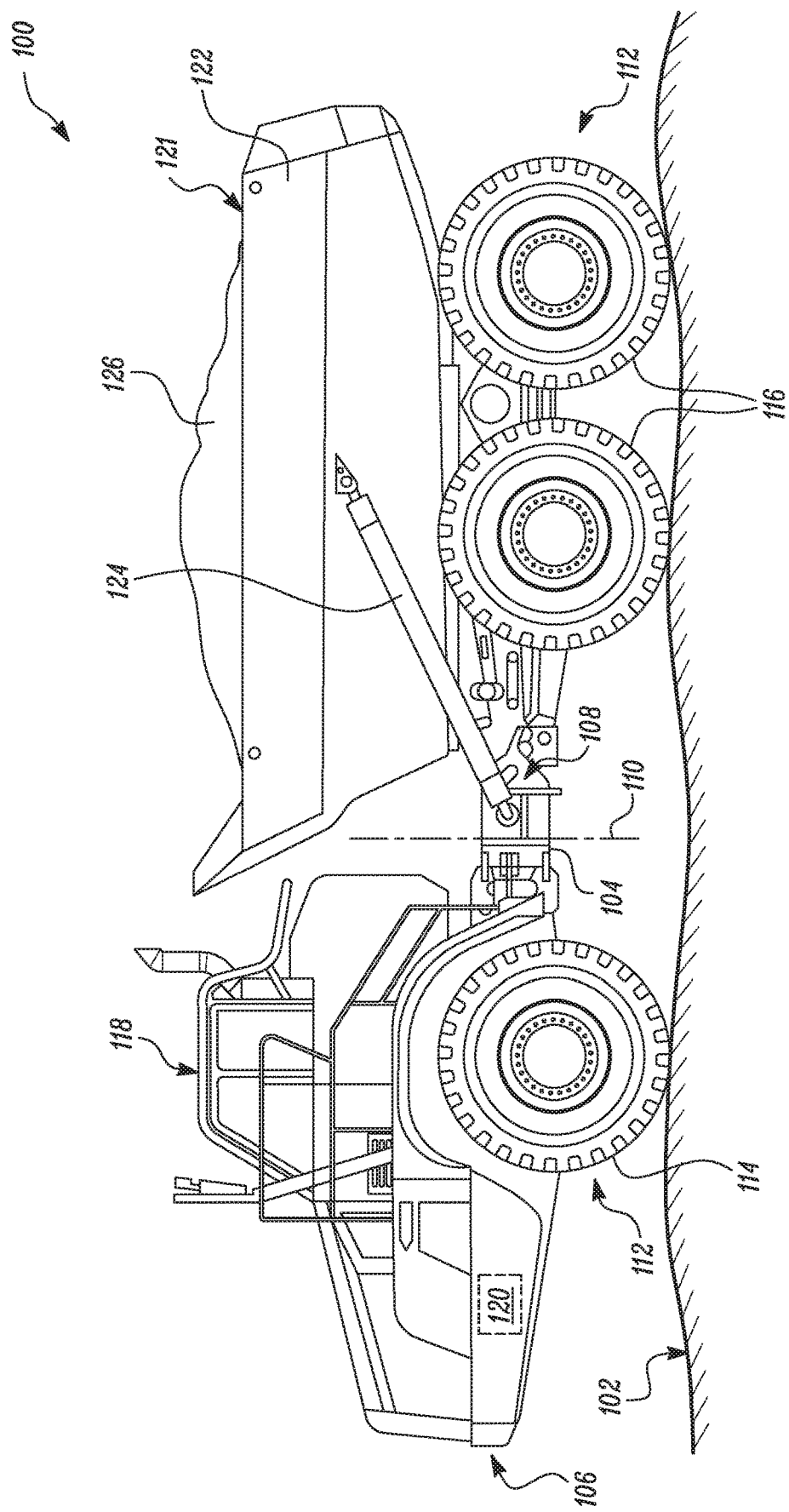
FIG. 1 illustrates an exemplary machine, in accordance with the concepts of the disclosure.

FIG. 1 illustrates an exemplary machine 100 configured to operate at a worksite 102. The worksite 102 may include a mine site, a land fill, a quarry, a construction site, or any other type of worksite. As shown in FIG. 1, the machine 100 is embodied as an articulated truck. However, it may be contemplated that the machine 100 may be any type of machine configured to perform some type of operation associated with an industry such as mining, construction, farming, transportation, or any other industry. Other examples of the machine 100 may include, but not limited to, an off-highway truck, a dump truck, an excavator, or the like. Further, the machine 100 may be a manned machine or an unmanned machine. In some embodiments, the machine 100 may be a machine having a various level of autonomy, such as fully-autonomous machine, a semi-autonomous machine, a remotely operated machine, or a remotely supervised machine.

As illustrated in FIG. 1, the machine 100 includes a frame 104 having a front frame portion 106, and a rear frame portion 108 coupled at an articulation axis 110. The machine 100 further includes one or more ground engaging members 112 configured to propel the machine 100 at the worksite 102. As shown in FIG. 1, the ground engaging members 112 are a set of drive wheels including a pair of front wheels 114 (only one side shown) and a set of rear wheels 116 (only one side shown). Although the ground engaging members are shown to be drive wheels, it may be contemplated that other types of ground engaging members, such as endless tracks, may also be implemented.

The front frame portion 106 supports an operator cab 118 and a power unit 120. The power unit 120 includes an engine, hereinafter referred to as the engine 120, that may be based on one of the commonly applied power-generation units, such as an internal combustion engine (ICE) having a V-type configuration engine, an in-line, configuration engine, or an engine with different configurations, as is conventionally known. However, aspects of the present disclosure, need not be limited to a particular type of power generation unit.

The rear frame portion 108 supports an implement 121, such as a bed 122 which may be selectively pivoted between a loading and an unloading position. The pivoting of the bed 122 may be accomplished using one or more hoist cylinders 124 (only one side shown) in response to the commands given by an operator of the machine 100 using one or more hoist controls (not shown) positioned inside the operator cab 118. While an articulated truck with a pivoted bed 122 is illustrated and described herein, aspects of this disclosure may apply to other load hauling machines including, for example, unarticulated machines, or machines including a bed that incorporates an ejector plate that may be actuated by one or more dump cylinders to similarly push or eject a payload 126 contained in the bed 122.

Figure 2:
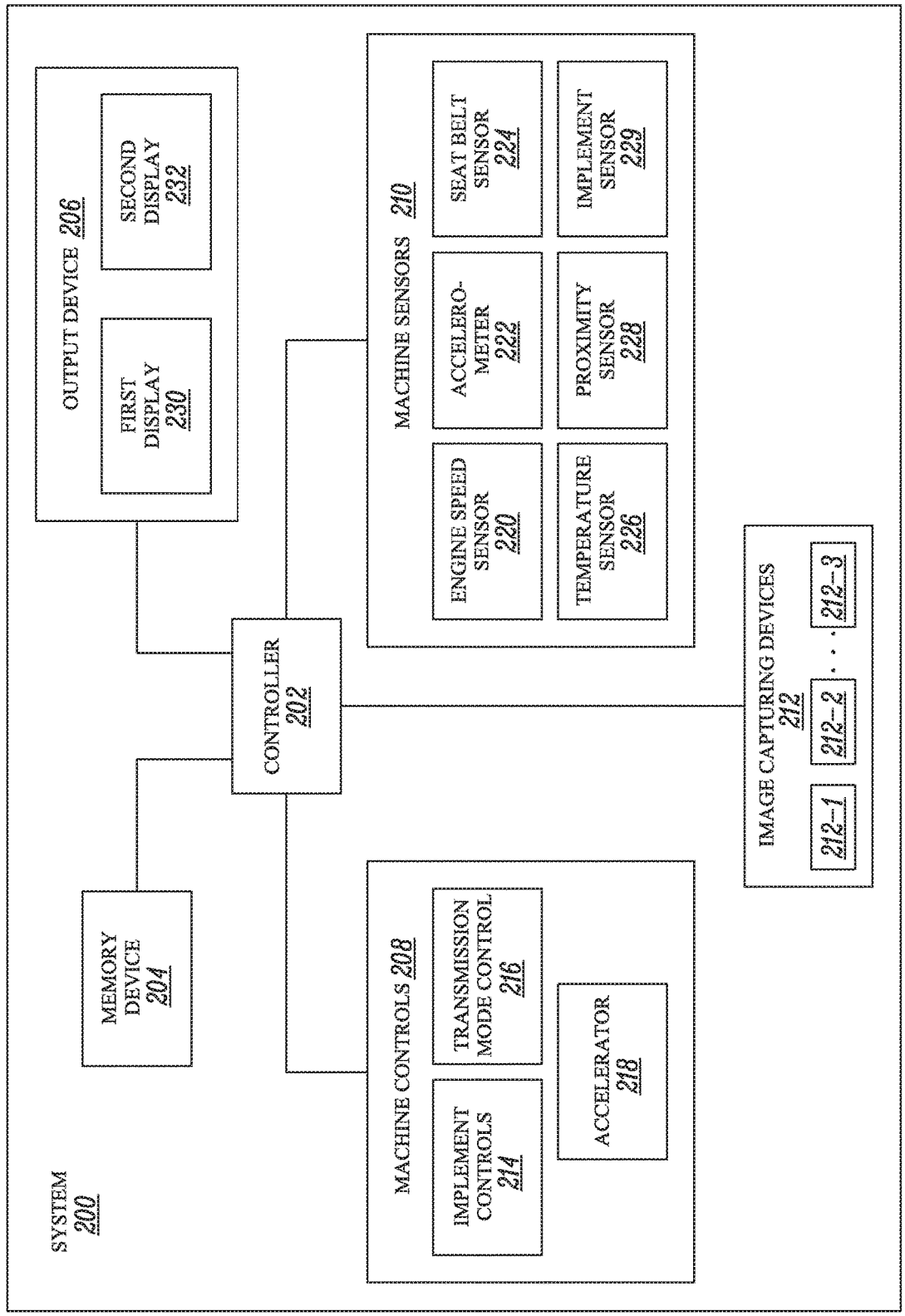
FIG. 2 illustrates a block diagram of a system for providing display redundancy for the machine, in accordance with the concepts of the disclosure.
Figure 3:
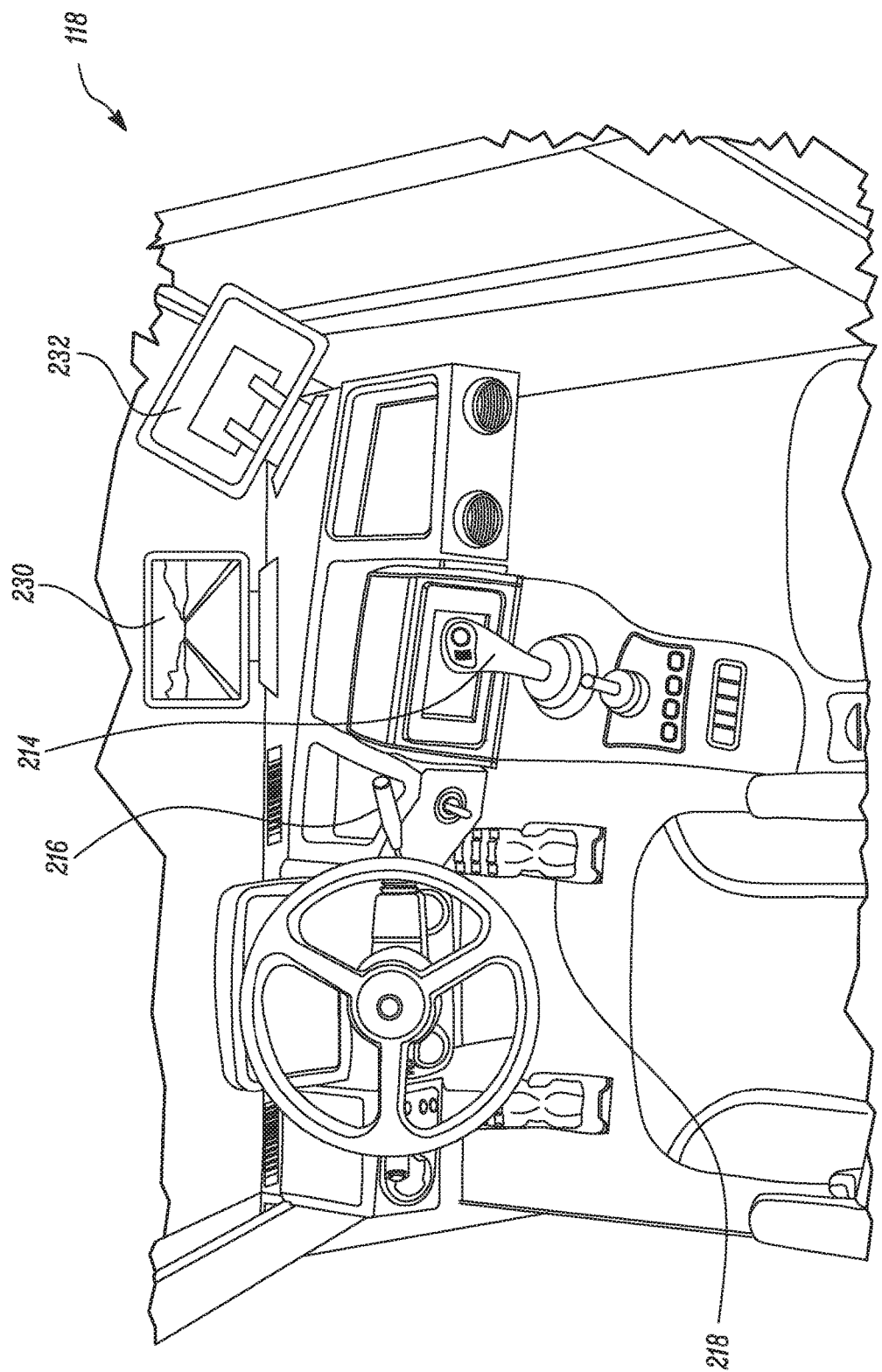
FIG. 3 illustrates a perspective view of an exemplary operator cab of the machine, in accordance with the concepts of the present disclosure.

Referring to FIGS. 2 and 3, the machine 100 includes a system 200 for monitoring and controlling various operations of the machine 100. The system 200 may include suitable logic, circuitry, and/or interfaces that are configured to control the various operations of the machine 100 at the worksite 102. Additionally, the system 200 may be configured to monitor the worksite 102, and accordingly, control the one or more operations of the machine 100. A person having ordinary skill in the art would appreciate that the scope of the disclosure is not limited to include the system 200 provided onboard the machine 100. In some embodiments, the system 200, or portions of the system 200, may be implemented remotely with respect of the machine 100, without departing from the scope of the disclosure.

Referring now to FIG. 2, the system 200 includes a controller 202, a memory device 204, one or more output devices 206, one or more machine controls 208, one or more sensors 210, and one or more image capturing devices 212. Additionally, or alternatively, the system 200 may include fewer or additional elements, not described herein for the sake of brevity of the disclosure.

The controller 202 is communicably coupled to the memory device 204, the one or more output devices 206, the one or more machine controls 208, the one or more sensors 210, and the one or more image capturing devices 212. In an exemplary embodiment of the present disclosure, the one or more components of the system 200 may be configured to communicate via a communication network (not shown). The controller 202 is configured to execute the instruction stored in the memory device 204 to perform one or more predetermined operations associated with the machine 100. The controller 202 may be implemented using one or more controller technologies, such as Application Specific Integrated Circuit (ASIC), Reduced Instruction Set Computing (RISC) technology, Complex Instruction Set Computing (CISC) technology, etc. According to an embodiment of the present disclosure, the controller 202 may be implemented as an Electronic Control Module (ECM) of the machine 100.

The memory device 204 is configured to store a set of instructions that are executable by the controller 202 to perform the predetermined operation (for example, controlling the operations of the machine 100). The memory device 204 may include, but are not limited to, a Random-Access Memory (RAM), a Read Only Memory (ROM), a Hard Disk Drive (HDD), and a Secure Digital (SD) card. The one or more output devices 206 are configured to provide output to an operator of the machine 100 in the form of audio, video, textual and/or any other form of output based on instructions received from the controller 202. The one or more output devices 206 may be positioned within the operator cab 118 of the machine 100 and/or may be remotely located with respect to the machine 100 and the worksite 102. In some embodiments, the one or more output devices 206 may include one or more display devices, audio output devices, textual output devices, or the like.

Further, the system 200 includes one or more machine controls 208, positioned inside the operator cab 118, for enabling the operator to control one or more operations of the machine 100 at the worksite 102. The machine controls 208 may be communicably coupled to the controller 202 and/or the other components of the machine 100. Based on an input received from the operator, the machine controls 208 may send input to the controller 202 and/or the other components of the machine 100, indicative of the operator input for controlling the one or more functionalities of the machine 100.

The one or more machine controls 208 may include an implement control 214, a transmission mode control 216, an accelerator 218, etc., positioned inside the operator cab 118, through which the operator may be able to control the one or more components and operations of the machine 100. For example, the implement control 214 may be configured to control the hoist cylinders 124 and in turn control the movement of the implement 121, such as the bed 122, for loading and/or unloading the payload 126 from the machine 100. Examples of the implement control 214 may include, but not limited to, a joystick, a lever, a touch screen or any other suitable device through which the operator may control the implements of the machine 100. Similarly, the transmission mode control 216 and the accelerator 218 facilitate the operator to maneuver the machine 100 at the worksite 102. For example, the transmission mode control 216 facilitates the operator to choose a mode from a given selection of modes, such as drive mode, reverse mode, park mode, etc., and accordingly control the ground engaging members 112 to maneuver the machine 100. Further, the accelerator 218 facilitates the operator to accelerate or decelerate the machine 100 during operations at the worksite 102. The detailed working of these various machine controls is not described herein for the sake of brevity of the disclosure. Although only a limited number of machine controls are described herein, it may be contemplated that the machine 100 may include additional, lesser or different controls for controlling the one or more operations of the machine 100.

The machine 100 further includes one or more machine sensors 210 positioned on the machine 100 and configured to sense one or more operational parameters associated with the machine 100. The machine sensors 210 assist the operator in operating the machine 100 according to the various sensed parameters of the machine 100. In an exemplary embodiment, the machine 100 may include an engine speed sensor 220, an accelerometer 222, a seat belt sensor 224, a temperature sensor 226, a proximity sensor 228, or the like positioned at various positions on the machine 100. The machine 100 may further include additional machine sensors to sense other machine parameters. Further, the machine 100 may also include one or more implement sensors 229 such as tilt sensors, inclinometer, grade detector, gyroscopes, LIDAR (Light Detection and Ranging) sensor, a radar sensor, or the like to sense one or more operational parameters of the implement 121. It may be contemplated by a person skilled in the art that these controls and sensors are merely exemplary and that the machine 100 may include additional, different, or fewer sensors than the ones described herein.

The one or more sensors 210 is communicably coupled to the controller 202 and configured to transmit the sensed parameters to the controller 202, which in turn transmits these parameters to the output devices 206. Such sensed parameters, output on the one or more output devices 206 facilitate the operator in operating the machine 100. For example, based on the engine speed, the speed of the machine 100, engine temperature, presence of an object near the machine 100, etc., the operator of the machine 100 may accordingly control the operations of the machine 100.

Furthermore, the machine 100 includes one or more image capturing devices 212 mounted on the periphery of the machine 100 and configured to capture images and videos of the surroundings of the machine 100 at the worksite 102. The image capturing devices 212 may be configured to transmit the captured images and videos to the controller 202 for various purposes. In some examples, the image capturing devices 212 may include, but not limited to, an automatic or manual video camera, a single or multiple lens camera, having their respective viewing angle, or the like. The controller 202 may be further configured to transmit these images/videos to the one or more output devices 206 associated with the machine 100, and the operator may operate the machine 100 according to the videos/images of the surroundings displayed on the one or more output devices 206. For example, while reversing the machine 100 at the worksite 102, the operator may view the rear view video, captured by one or more image capturing devices 212 positioned at the rear side of the machine 100, on one of the output devices amongst the one or more output devices 206, to carefully reverse the machine 100.

In one embodiment of the present disclosure, the system 200 includes two or more displays associated with the machine 100 and may be positioned inside the operator cab 118 or remotely with respect to the machine 100. For example, as illustrated in FIG. 3, the system 200 includes a first display 230, and a second display 232 associated with the machine 100 and positioned inside the operator cab 118. It may be contemplated that the number and positions of the displays illustrated and described herein are merely exemplary and that the system 200 may include additional displays and they may be positioned in any desired manner within the operator cab 118, without deviating from the scope of the claimed subject matter.

Figure 4:
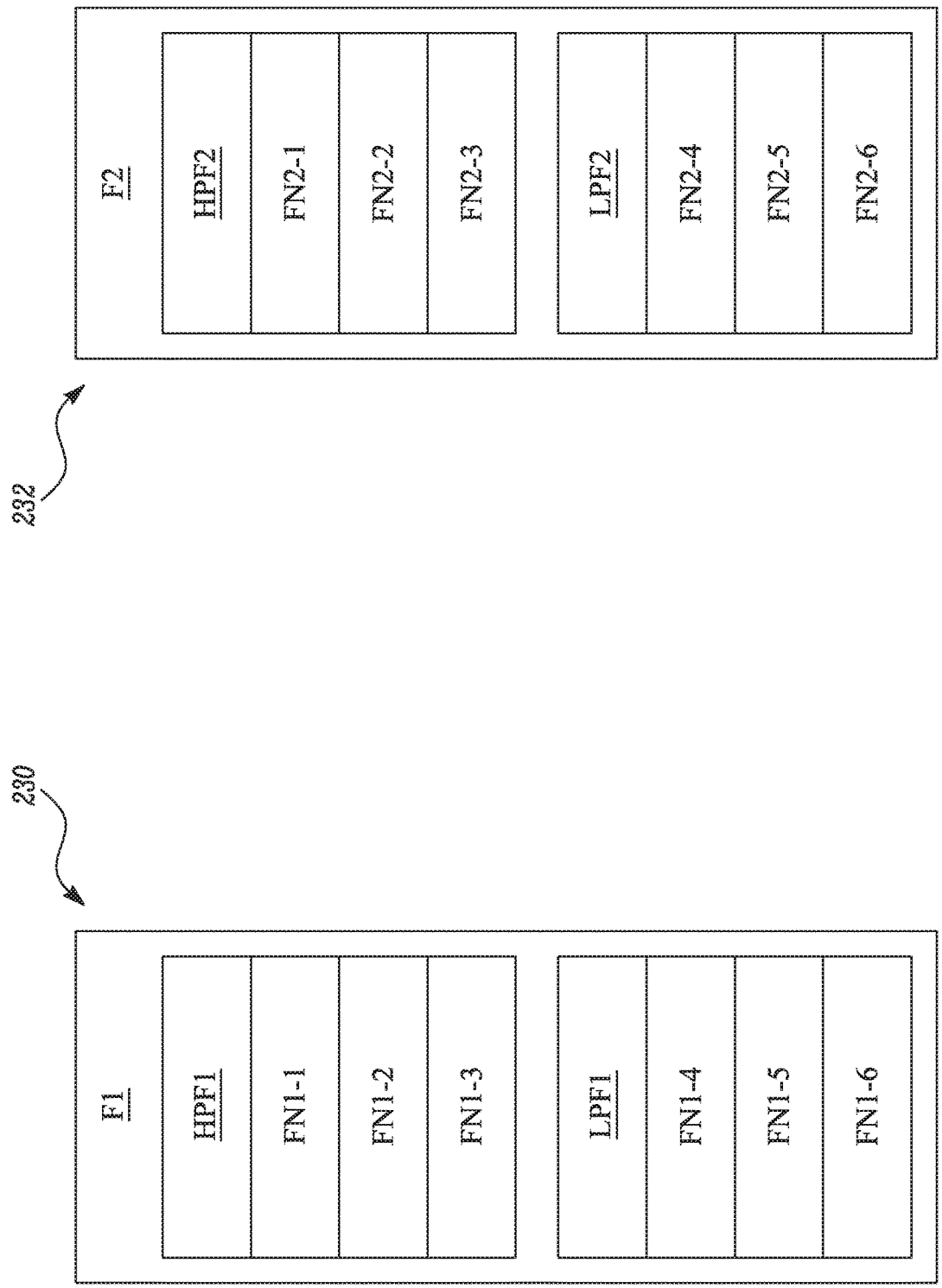
FIG. 4 illustrates exemplary functionalities performed by a first display and a second display of the machine, in accordance with the concepts of the present disclosure.

Each of the first display 230 and the second display 232 may perform their respective set of functionalities associated with one or more operations of the machine 100. For example, as shown in FIG. 4, the first display 230 may perform a first set of functionalities F1 and the second display 232 may perform a second set of functionalities F2 associated therewith, such that the first set of functionalities F1 is different from the second set of functionalities F2. The set of functionalities performed by either of the first display 230 or the second display 232 may include, but not limited to, displaying visual representations of the surroundings of the machine 100 at the worksite 102, displaying rear view of the machine 100 during reversing of the machine 100, displaying one or more operational parameters associated with the engine 120, displaying one or more operational parameters associated with the implement 121, such as the bed 122, of the machine 100, displaying alarms and alerts based on one or more operational parameters associated with the machine 100, the engine 120 and/or the implement 121, displaying one or more operational parameters associated with the machine 100, or the like.

In an embodiment of the present disclosure, each of the first set of functionalities F1 and the second set of functionalities F2 may be divided into a subset of high priority functionalities and a subset of low priority functionalities, according to the criticality of every functionality with respect to operating the machine 100. In general, both the high priority functionalities as well as the low priority functionalities performed by the displays 230, 232 are important for smooth functioning of the machine 100 at the worksite 102. However, some of the functionalities performed by the displays 230, 232 are critical for operating the machine 100 and without such critical functionalities, the machine 100 may not be able to operate at all.

In some examples, a seat belt unplugged alarm may be a low priority functionality, whereas displaying visual representations of the surroundings of the machine 100 may be critical for safely operating the machine 100 at the worksite 102. Similarly, in some examples, displaying operational parameters of the engine 120, such as the engine running speed, engine temperature etc., may be low priority functionalities. However, displaying generated alarms associated with these operational parameters associated with the engine 120, such as displaying an alert when the temperature of the engine 120 is greater than a threshold, may be a high priority functionality performed by a display. In a yet another example, displaying visual representation of the surroundings of the machine 100 may be a low priority functionality whereas generating an alert when one or more object(s) are detected in the operational ambit of the machine 100 may be a high priority functionality performed by a display.

As shown in FIG. 4, the first set of functionalities F1 performed by the first display 230 may include a subset of high priority functionalities HPF1, including functionalities FN1-1, FN1-2, and FN1-3, and a subset of low priority functionalities LPF1 including functionalities FN1-4, FN1-5, and FN1-6. Similarly, the second set of functionalities F2 performed by the second display 232 may include a subset of high priority functionalities HPF2 including functionalities FN2-1, FN2-2, and FN2-3 and a subset of low priority functionalities LPF2 including functionalities FN2-4, FN2-5, and FN2-6. These functionalities to be performed by the first display 230 and the second display 232 may vary according to the type of the machine 100 and may be predefined and prestored in the memory device 204 of the system 200 of the machine 100.

The controller 202 may communicate with the one or more sensors 210 and the one or more image capturing devices 212 to generate content to be displayed on each of the first display 230 and the second display 232. The controller 202 may be further configured to communicate with the memory device 204 to identify the set of functionalities performed by each of the first display 230 and the second display 232 and accordingly generate the content to be displayed by each of the displays 230, 232.

Let us consider the following exemplary embodiment for the purposes of understanding how the various functionalities may be performed by the first display 230 and the second display 232.

In one example, the first display 230 is configured to display the surroundings of the machine 100 while operating the machine 100 at the worksite 102, display the rear view of the machine 100 while reversing the machine 100 at the worksite 102, generate an alert when there is an object detected in proximity of the machine 100, generate an alert if there is an obstacle detected while reversing the machine 100, and generate a seat belt unplugged alarm. Further, in this example, the second display 232 is configured to display operational parameters associated with the engine 120, display one or more operational parameters associated with the implement 121, and display alerts when one or more operational parameters associated with the engine 120 and/or the implement 121 are beyond threshold or critical value.

In this case, the image capturing devices 212 may be configured to transmit the captured images of the surroundings of the machine 100 to the controller 202, which subsequently transmits the same to be displayed on the first display 230. Further, the image capturing devices 212 positioned on the rear side of the machine 100 may be configured to transmit the rear-view images of the machine 100 to the controller 202, which further transmits the same to be displayed on the first display 230. Additionally, the proximity sensors 228 are configured to detect an object in proximity of the machine 100, and the controller 202 generates an alert to be displayed on the first display 230 when the object is detected in the proximity of the machine 100. Furthermore, the seat belt sensor 224 may transmit the seat belt unplugged alert to the controller 202, that further transmits the same to be displayed on the first display 230.

Similarly, the engine speed sensor 220, the temperature sensor 226, and other sensors associated with the engine 120 are configured to sense the one or more operational parameters associated with the engine 120 and transmit the same to the controller 202, which further transmits the same to be displayed on the second display 232. Similarly, the implement sensors 229 associated with the implement 121 are configured to sense and transmit the one or more operational parameters associated with the implement 121 to the controller 202, which further transmits the same to be displayed on the second display 232. The operator sitting inside the operator cab 118 may refer to the displayed content on each of the first display 230 and the second display 232 while operating the machine 100 at the worksite 102.

In an embodiment, the system 200 is configured to provide display redundancy for the machine 100, when one of the displays fails to operate. To that, the controller 202 is configured to detect a failure of either of the first display 230 or the second display 232. For example, the first display 230 and the second display 232 may be implemented on the communication network with the controller 202 using the heartbeat protocol. Each of the first display 230 and the second display 232 are configured to generate and transmit a heartbeat signal at regular time intervals to the controller 202 to indicate normal operation. Therefore, the controller 202 detects failure of one of the first display 230 or the second display 232, when it fails to receive heart beat signals from either of the first display 230 or the second display 232 for a predefined time-period. For example, the controller 202 is configured to receive heart beat signals from each of the first display 230 and the second display 232 every 5 seconds. Accordingly, when the controller 202 fails to receive heartbeat signals from the first display 230 for continuous 20 seconds, then the controller 202 detects that the first display 230 has failed.

It may be contemplated that although the first display 230 and the second display 232 are described to be connected to the controller 202 through use of the heartbeat protocol, some or all other components of the system 200 may also be implemented using the heartbeat protocol and the controller 202 may receive heartbeat signals from the other components as well in the similar manner. In an alternative embodiment, each of the displays, such as the first display 230 and the second display 232 may be connected to one another directly and receive heartbeat signals from one another and detect failure of one of the displays. In such a case, the first display 230 and/or the second display 232 may implement their own respective controllers. Further, the heartbeat protocol for detecting failure of the displays is merely exemplary and it may be contemplated that any other methodology for detecting failure of one of the first display 230 or the second display 232 may be implemented without deviating from the scope of the claimed subject matter.

In an embodiment of the present disclosure, at least a subset of functionalities performed by the display that has failed, are executed on the remaining other displays positioned within the operator cab 118 to provide display redundancy for the machine 100. For example, once the controller 202 detects that the first display 230 has failed, it executes at least a subset of the first set of functionalities F1 on the second display 232 along with at least a subset of the second set of functionalities F2. In an alternative embodiment, when the displays are directly connected to one another and the second display 232 detects failure of the first display 230, then the second display 232 automatically executes at least a subset of the first set of functionalities F1 along with a subset of the second set of functionalities F2 performed by itself. According to the embodiments presented herein, at least the subset of high priority functionalities HPF1 performed by the first display 230 that has failed, may be executed on the other displays, such as the second display 232, positioned within the operator cabin 118.

Figure 5:
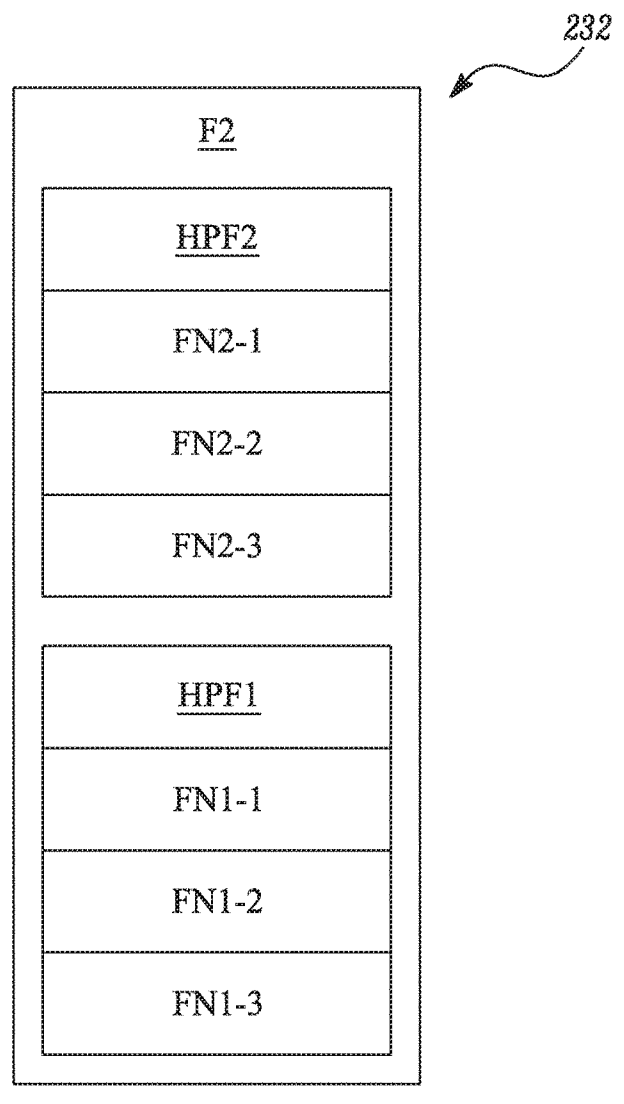

For implementing at least the subset of high priority functionalities HPF1 performed by the first display 230 on the second display 232, the controller 202 is configured to disable at least a subset of low priority functionalities LPF2 performed by the second display 232. For the purposes of explanations, FIG. 5 illustrates the functionalities performed by the second display 232 when the first display 230 fails. As shown, the low priority functionalities LPF2 performed by the second display 232 are disabled to accommodate the high priority functionalities HPF1 performed by the first display 230. Therefore, in the event of failure of the first display 230, the second display 232 is configured to perform the High priority functionalities HPF2 (including FN2-1, FN2-2 and FN2-3) that were originally performed by the second display 232 along with the high priority functionalities HPF1 (including FN1-1, FN1-2 and FN1-3) that were performed by the first display 230 that has now failed.

In an exemplary embodiment, the first display 230 performs the high priority functionalities HPF1, such as displaying the rear view of the machine 100 while reversing the machine 100 at the worksite 102, generate an alert when there is an object detected in proximity of the machine 100, and generate an alert if there is an obstacle detected while reversing the machine 100. Further, the first display 230 also performs a number of low priority functionalities, such as display the surroundings of the machine 100 while operating the machine 100 at the worksite 102 and/or display a seat belt unplugged alert. Similarly, the high priority functionalities HPF2 performed by the second display 232 include displaying one or more operational parameters associated with the implement 121, and/or displaying alerts when one or more operational parameters associated with the engine 120 and/or the implement 121 are beyond threshold or critical value. The low priority functionalities LPF2 performed by the second display 232 include displaying operational parameters associated with the engine 120, and displaying operational parameters associated with the machine 100, etc. Therefore, when the first display 230 fails, the second display 232 stops displaying the operational parameters associated with the engine 120 and the machine 100, while continues to display alerts when any of the operational parameters associated with the engine 120 and/or the machine 100 are beyond critical value. Further, the second display 232 also starts displaying alerts when there is an object detected in proximity of the machine 100, displaying the rear view of the machine 100 while reversing the machine 100, and displaying alert if there is an obstacle detected while reversing the machine 100, which were earlier performed by the first display 230.

Although the foregoing description is provided for only two displays positioned within the operator cab 118, it may be well contemplated that for machines having higher number of displays, the system 200 may provide display redundancy in a similar manner as described above. For example, when one or more of the displays fail, then the high priority functionalities performed by these failed displays may be divided amongst all the other remaining displays that operate normally. Therefore, as described previously, the low priority functionalities performed by these other normally operating displays may be disabled to accommodate the high priority functionalities of the failed displays. It may be further contemplated that the manner in which such high priority functionalities of the failed display(s) are distributed amongst the normally operating displays may also be varied as desired to achieve similar results, without deviating from the scope of the claimed subject matter. It may be further contemplated that in order to execute the high priority functionalities of the failed display on the remaining displays that operate normally, the low priority functionalities of the other displays may not be disabled completely. For example, the low priority functionalities of the other normally operating displays may be displayed in a compressed view on the screen while the high priority functionalities may be displayed in the larger portion of the screen of the display.

INDUSTRIAL APPLICABILITY

For a machine implementing display with embedded alarm system, it becomes difficult to smoothly operate the machine when the display fails or malfunctions. Moreover, the display may also perform other functionalities that may be critical for the smooth operations of the machine. Therefore, for the machine 100 having two or more displays, such as the first display 230 and the second display 232, the system 200 of the present disclosure provides display redundancy on the machine 100 when one of the displays associated with the machine 100 fails.

Figure 6:
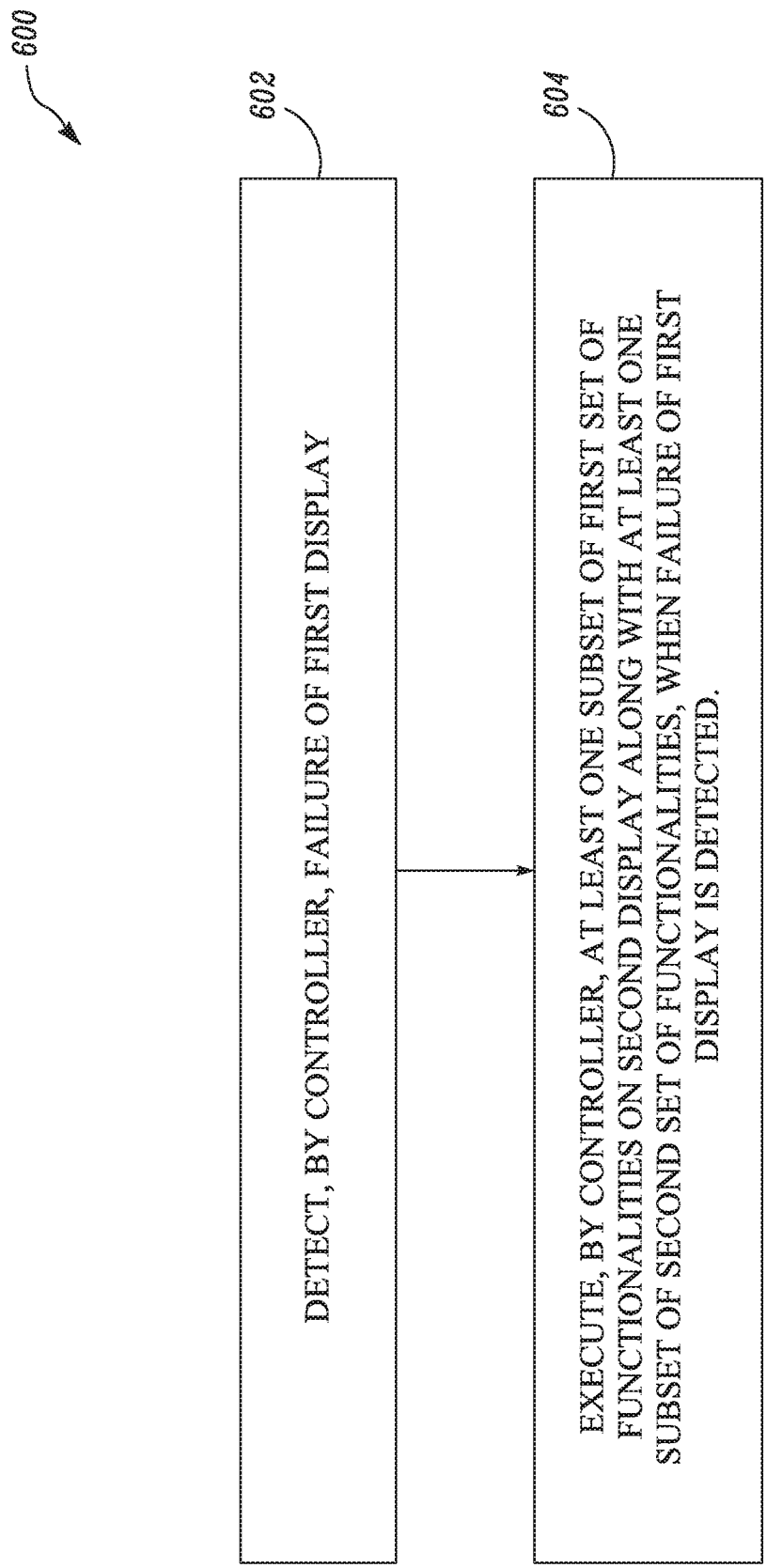
FIG. 6 illustrates a flowchart for an exemplary method of providing display redundancy for the machine, in accordance with the concepts of the present disclosure.

Referring to FIG. 6, an exemplary method 600 for providing display redundancy on the machine 100 having the first display 230 and the second display 232, is illustrated. The first display 230 and the second display 232 are configured to perform the first set of functionalities F1 and the second set of functionalities F2 different from the first set of functionalities F1, respectively. Each of the first set of functionalities F1 and the second set of functionalities F2 include the subset of high priority functionalities (HPF1, HPF2) and the subset of low priority functionalities (LPF1, LPF2) based on the criticality associated with each of the functionalities with respect to machine operations. In an embodiment of the present disclosure, the controller 202 is configured to perform the various steps of the method 600, as described in the following description.

Initially, at step 602, the controller 202 detects failure of the first display 230. In an exemplary embodiment, each of the first display 230 and the second display 232 may transmit heart beat signals to the controller 202 at regular time intervals to indicate normal operations. The controller 202 detects failure of the first display 230 when it fails to receive the heart beat signals from the first display 230 for a predefined time interval.

At step 604, the controller 202 executes at least a subset of the first set of functionalities F1 on the second display 232 along with at least a subset of the second functionalities F2, when the failure of the first display 230 is detected. In an embodiment of the present disclosure, the controller 202 executes the subset of high priority functionalities HPF1 of the first set of functionalities F1 performed by the first display 230 that failed, on the second display 232 along with the subset of high priority functionalities HPF2 of the second set of functionalities F2 performed by the second display 232.

Further, for executing the subset of high priority functionalities HPF1 of the first set of functionalities F1 on the second display 232, the controller 202 disables the subset of low priority functionalities LPF2 of the second set of functionalities F2 performed by the second display 232.

The system 200 and the method 600 provide display redundancy on the machine 100 having multiple displays associated therewith. The system 200 and the method 600 provide executing the high priority or critical functionalities of a failed display on the remaining displays of the machine 100 that operate normally. Therefore, the system 200 utilizes the existing displays associated with the machine 100 that are operating normally to serve as backup displays instead of having separate backup displays installed in the operator cab 118. Furthermore, the display redundancy ensures that the critical functionalities performed by each and every display within the operator cab 118 are not affected due to failure or malfunctioning of a display, thereby providing smooth operations of the machine 100 even when one or more of display fail.

Other embodiments will be apparent to those skilled in the art from consideration of the specification and practice of the system disclosed herein. It is intended that the specification and examples be considered as exemplary only, with a true scope of the disclosure being indicated by the following claims and their equivalent.

The invention claimed is:

1. A method for providing display redundancy on a machine configured to operate at a worksite, the machine including at least a first display and a second display associated therewith, the method comprising:
   detecting, by a controller, failure of the first display, wherein the first display is configured to perform a first set of functionalities associated with one or more operations of the machine and the second display is configured to perform a second set of functionalities, different from the first set of functionalities, associated with the one or more operations of the machine; and
   executing, by the controller, at least a subset of the first set of functionalities, on the second display along with at least a subset of the second set of functionalities, when the failure of the first display is detected, wherein each of the first and the second set of functionalities includes a subset of high priority functionalities and a subset of low priority functionalities and wherein a subset of high priority functionalities of the first set of functionalities are executed, by the controller, on the second display, when the failure of the first display is detected.

2. The method as claimed in claim 1, wherein the first and the second set of functionalities include one or more of displaying alarm or alerts an operator of the machine, displaying visual representations of surroundings of the machine, displaying operational parameters of the machine or displaying operational parameters of an implement of the machine.

3. The method as claimed in claim 1, wherein executing the subset of high priority functionalities of the first set of functionalities on the second display further includes disabling a subset of low priority functionalities of the second set of functionalities performed by the second display.

4. The method as claimed in claim 1, wherein detecting the failure of the first display includes receiving, by the controller, heartbeat signals from each of the first display and the second display at regular time intervals and detecting failure of the first display when the controller fails to receive the heartbeat signals from the first display for a predefined time period.

5. A system for providing display redundancy on a machine configured to operate at a worksite, the system comprising:
   a first display configured to perform a first set of functionalities associated with one or more operations of the machine;
   a second display configured to perform a second set of functionalities, different from the first set of functionalities, associated with the one or more operations of the machine;
   a controller communicably coupled to the first display and the second display, the controller being configured to:
   detect a failure of the first display; and
   execute at least a subset of the first set of functionalities, on the second display along with at least a subset of the second set of functionalities, when the failure of the first display is detected, wherein each of the first and the second set of functionalities includes a subset of high priority functionalities and a subset of low priority functionalities and wherein a subset of high priority functionalities of the first set of functionalities are executed, by the controller, on the second display, when the failure of the first display is detected.

6. The system as claimed in claim 5, wherein the controller is implemented on one or more of the machine, the first display or the second display.

7. The system as claimed in claim 5, wherein the first and the second set of functionalities include one or more of displaying alarm or alerts for an operator of the machine, displaying visual representations of surroundings of the machine, displaying operational parameters of the machine, or displaying operational parameters of an implement of the machine.

8. The system as claimed in claim 5, wherein the controller is configured to disable a subset of low priority functionalities of the second set of functionalities to execute the subset of high priority functionalities of the first set of functionalities on the second display, when the failure of the first display is detected.

* * * * *